(12) United States Patent
Benner, Jr.

(10) Patent No.: US 9,991,773 B2
(45) Date of Patent: Jun. 5, 2018

(54) LOW COST LIMITED ROTATION ROTARY ACTUATOR

(71) Applicant: William R. Benner, Jr., Longwood, FL (US)

(72) Inventor: William R. Benner, Jr., Longwood, FL (US)

(*) Notice: Subject to any disclaimer, the term of this patent is extended or adjusted under 35 U.S.C. 154(b) by 338 days.

(21) Appl. No.: 14/829,099

(22) Filed: Aug. 18, 2015

(65) Prior Publication Data
US 2016/0233753 A1    Aug. 11, 2016

Related U.S. Application Data

(60) Provisional application No. 62/112,755, filed on Feb. 6, 2015.

(51) Int. Cl.
| | |
|---|---|
| *H02K 1/27* | (2006.01) |
| *H02K 21/12* | (2006.01) |
| *H02K 33/16* | (2006.01) |
| *G02B 26/10* | (2006.01) |
| *H02K 11/21* | (2016.01) |
| *H02K 1/06* | (2006.01) |
| *H02K 21/02* | (2006.01) |
| *H02K 33/00* | (2006.01) |

(52) U.S. Cl.
CPC ............. *H02K 33/16* (2013.01); *G02B 26/10* (2013.01); *H02K 11/21* (2016.01)

(58) Field of Classification Search
CPC ...... H02K 33/16; H02K 21/046; H02K 21/12; H02K 1/27; H02K 1/2713; H02K 1/272; B41J 2/435; B41J 2/44; B41J 2/471
See application file for complete search history.

(56) References Cited

U.S. PATENT DOCUMENTS

| | | | |
|---|---|---|---|
| 2,721,904 A | 10/1955 | Souter | |
| 2,767,357 A | 10/1956 | Naybor | |
| 2,891,181 A | 6/1959 | Atchley | |
| 3,135,881 A | 6/1964 | Marcel | |
| 3,177,385 A | 4/1965 | Montagu | |
| 3,234,436 A | 2/1966 | Bieger | |
| 4,090,112 A * | 5/1978 | Selverstone | ........... H02K 33/10 310/36 |
| 4,319,823 A | 3/1982 | Hashimoto | |

(Continued)

FOREIGN PATENT DOCUMENTS

| | | |
|---|---|---|
| EP | 520387 | 12/1992 |
| JP | 4201317 | 12/2008 |
| KR | 101102675 | 1/2012 |

*Primary Examiner* — Edgardo San Martin
(74) *Attorney, Agent, or Firm* — Stephen G. Anderson; GrayRobinson, P.A.

(57) ABSTRACT

A limited rotation electromechanical rotary actuator includes a stator having an aperture sized to accept a rotor assembly and a rectangular coil. A rotor assembly is bidirectionally operable with the stator over a limited range of rotation. The rotor assembly includes an output shaft and a two-pole magnet and a position sensor shaft, wherein the output shaft and position sensor shaft are each rigidly attached to only a portion of the magnet. The rotor assembly includes apertures for allowing an electrical coil to pass through. The electrical coil extends around the magnet on four sides and is excitable for providing bidirectional torque to the rotor.

2 Claims, 17 Drawing Sheets

(56) References Cited

U.S. PATENT DOCUMENTS

| | | | |
|---|---|---|---|
| 4,595,849 A * | 6/1986 | Cuenoud | A61C 17/34 310/36 |
| 4,795,929 A | 1/1989 | Elgass et al. | |
| 4,817,076 A | 3/1989 | Van et al. | |
| 4,942,333 A | 7/1990 | Knox | |
| 5,191,618 A * | 3/1993 | Hisey | H02K 26/00 340/815.87 |
| 5,225,770 A * | 7/1993 | Montagu | G01R 5/06 324/146 |
| 5,313,127 A * | 5/1994 | Danley | H02K 26/00 310/156.11 |
| 5,424,632 A * | 6/1995 | Montagu | G01R 5/06 310/36 |
| 5,708,406 A | 1/1998 | Tsunoda et al. | |
| 5,831,356 A * | 11/1998 | Aoshima | H02K 7/06 310/266 |
| 5,831,363 A | 11/1998 | Fukita et al. | |
| 5,936,324 A * | 8/1999 | Montagu | H02K 1/2726 310/156.11 |
| 6,448,673 B1 | 9/2002 | Brown et al. | |
| 6,633,101 B2 * | 10/2003 | Stokes | H02K 26/00 310/208 |
| 6,809,451 B1 * | 10/2004 | Brown | H02K 26/00 310/154.31 |
| 6,833,639 B2 | 12/2004 | Lau et al. | |
| 6,891,287 B2 * | 5/2005 | Moret | H02K 33/16 310/156.01 |
| 6,960,848 B2 | 11/2005 | Naganuma et al. | |
| 7,122,920 B2 | 10/2006 | Mizumaki | |
| 7,158,323 B2 | 1/2007 | Kim et al. | |
| 7,212,325 B2 | 5/2007 | Pruyn | |
| 7,262,535 B2 | 8/2007 | Pruyn | |
| 7,365,464 B2 * | 4/2008 | Brown | H02K 1/2726 310/156.11 |
| 7,471,432 B2 | 12/2008 | Pruyn | |
| 8,327,488 B2 * | 12/2012 | Takahashi | H02K 33/16 15/105 |
| 8,446,055 B2 | 5/2013 | Jun et al. | |
| 8,569,920 B2 * | 10/2013 | Ramon | H02K 1/2726 310/156.08 |
| 8,587,162 B2 | 11/2013 | Kagami et al. | |
| 8,963,396 B2 * | 2/2015 | Benner, Jr. | H02K 33/16 310/216.022 |
| 9,077,219 B2 * | 7/2015 | Benner, Jr. | H02K 33/16 |
| 9,270,144 B2 * | 2/2016 | Benner, Jr. | H02K 33/16 |
| 9,366,860 B1 * | 6/2016 | Benner, Jr. | G02B 26/105 |
| 2011/0203061 A1 * | 8/2011 | Takahashi | A61C 17/32 15/22.1 |
| 2012/0043832 A1 | 2/2012 | Neff et al. | |
| 2013/0076185 A1 | 3/2013 | Benner | |
| 2013/0076194 A1 | 3/2013 | Benner | |
| 2013/0181549 A1 | 7/2013 | Benner | |

\* cited by examiner

LOW COST LIMITED ROTATION ROTARY ACTUATOR

CROSS-REFERENCE TO RELATED APPLICATIONS

This application claims the benefit of U.S. Provisional Application No. 62/112,755, having filing date of Feb. 6, 2015 the disclosure of which is hereby incorporated by reference in its entirety and commonly owned.

FIELD OF THE INVENTION

The present invention generally relates to limited angle electromechanical rotary actuators and in particular to actuators used in the field of optical scanning.

BACKGROUND

Limited-angle, electromechanical rotary actuators have been in existence for decades. They are used in a variety of industrial and consumer applications, but they are particularly useful in the field of optical scanning, where an optical element is attached to an actuator output shaft, and is then rotated back and forth in an oscillating manner.

For example and as illustrated with reference to FIG. 1, it is common to attach a mirror to the output shaft of a rotary actuator in order to create an optical scanning system. In this application, the actuator/mirror combination can redirect a beam of light through a range of angles, or redirect the field of view of a camera so that it can observe a variety of targets.

Typical electromechanical rotary actuators used in the field of optical scanning are generally made from some combination of magnet, steel and coils of insulated "magnet" wire. These elements have been arranged in a variety of ways, but for the past twenty years, the most popular arrangement has been to use a simple two-pole rotor magnet, and a "toothless" stator design, similar to a slotless/brushless DC or AC synchronous motor, but having a simpler, single-phase coil arrangement.

The rotor within these actuators is typically made of a cylindrical magnet, onto which one or two shafts are attached in one way or another. Several known rotor assemblies are illustrated by way of example with reference to FIGS. 2, 3 and 4.

When this type of actuator is used for optical scanning, one shaft may be attached to a mirror and another shaft operable with a position sensor. The rotor assembly is typically supported on one side or both sides by ball bearings.

It will be helpful to review known actuator technology and make reference to known actuators to have the reader better understand the needs satisfied by embodiments of the present invention.

FIG. 5 illustrates a sectional view of a rotor magnet, stator and coil arrangement found in a typical conventional optical scanner of current state of the art. The stator is essentially tubular and made from a solid piece of magnetically conductive material such as cold rolled steel. For the rotor magnet having a diameter of 0.120 inches, a typical stator tube may have an outside diameter of 0.5 inches (around 12.7 millimeters), and an inside diameter of 0.196 inches (approximately 5 millimeters). The coil is made of turns of magnet wire, bonded to the inside wall of the stator steel tube using epoxy. Each side of the coil is formed as an arc, often occupying an approximately 90-degree arc on each side of the stator as herein illustrated. There is typically around a 0.007 inch gap between the outside wall of the rotor magnet and the inside wall of the coil, thus allowing the magnet to rotate freely. With continued reference to FIG. 5, the coil areas are designated "Coil plus" and "Coil minus" to indicate turns going into the page and turns coming out of the page, respectively.

FIG. 6 illustrates magnetic field lines found in a conventional optical scanner of the current state of the art as illustrated in FIG. 5, using a solid cylindrical diametral-magnetized rotor magnet. It can be seen that the magnetic flux lines must extend ("jump") across a relatively large gap to reach the stator steel. The coil resides in between the magnet and the stator steel. When the coil is energized, a Lorentz Force is imposed on both the coil and the magnet. Since the coil is typically bonded to the stator and thus, held stationary, all of the force is conveyed to the rotor magnet. Since force is created on opposite sides of the magnet, the force being in the form of torque, the actuator creates torque and thus creates motion.

FIG. 9a illustrates one cylindrical rotor magnet and coil windings. As shown, the magnet essentially resides "inside" the coil. Steel which resides outside the coil is not shown in this illustration. The coil includes multiple turns of magnet wire. The long, straight portion of the coil is known as the "active portion" because this is the portion which contributes to torque on the magnet. The rounded portion of the coil is known as "end-turns". The end turns do not contribute to torque production. They are merely there to connect the active portion on one side of the coil to the other side of the coil. However, any heating of the drive coil that results from current passing through it, also exists in the end turns. Thus, while the end turns do not contribute to torque production, they do contribute to heat, ohmic resistance and electrical inductance, all attributes which are detrimental to overall actuator performance. Therefore, there is motivation to keep the end-turns as short as possible in order to minimize these detrimental effects.

By way of further example with reference again to FIG. 9a, the coil is shown having its coil windings completely surrounding the magnet on top, bottom, left and right portions. This coil arrangement is typically not used in known actuators because the end turns as diagrammatically illustrated in this FIG. 9a would prevent a shaft from reaching the magnet. Instead, the end turns must be bent out of the way (or rather "formed"), as illustrated with reference to FIG. 9b. When the end-turns are formed in this way, this typically allows for the shaft (which is attached to the magnet) to "pass through" the end turns and result in what is effectively a "hole" formed in the coil. Of course, this means that the "end-turns" must be made undesirably longer in order to create such a "hole". As will be illustrated later in the teachings of the present invention, such an undesirable feature is eliminated in actuators herein presented by way of example.

Such a conventional actuator arrangement provides some desirable benefits. One benefit is the relatively low coil inductance that results from the fact that the coil does not completely surround a closed steel core. Quite the contrary, the entire inside of the actuator is open, containing only the rotor magnet whose permeability is almost the same as that of air. Another benefit is that the rotor generally has no "preferred position", meaning that once the rotor is positioned, power can be removed from the coil and the rotor will remain in that position. For optical scanning applications, the performance of this type of actuator is well suited for applications including laser marking and some laser graphic projection.

However, although this conventional actuator structure has been used successfully for optical scanning for more than two decades, the costs involved in forming the coil and then bonding the coil to the stator have prevented this type of actuator from being highly successful in certain consumer-grade applications, including point-of-purchase displays, 3D printers, and certain self-driving and assisted-driving automobiles, where low cost is paramount.

For the type of actuator whose arrangement is shown in FIG. 5 and end turns formed as above presented in FIG. 9b, the coil is the most difficult and thus most costly part to manufacture, because ideally, it must be wound in three dimensions. Coils of this type are generally shown in FIG. 2a of U.S. Pat. No. 4,090,112 (item 50); FIG. 1 of U.S. Pat. No. 5,313,127 (item 30); FIG. 8 of U.S. Pat. No. 5,424,632 (item 75); and FIG. 4 of U.S. Pat. No. 6,633,101 (item 34 and 42). Although some of the figures show all of the individual coil turns neatly formed and having very good copper packing, such coil windings are typically known not to be this neat. Because of the 3D nature of the coil winding, the individual turns often effectively compete for space, with turns "crossing over" each other, thus leading to sub-optimal current density distribution as well as sub-optimal heat sharing among the turns of the coil.

Nevertheless, once the coil is formed, inserting it into the stator is the next challenge. Because of the close proximity of the stator wall to the coil windings, the insulation on the coil can be scratched during the insertion process, leading to an instant, or latent "coil-to-case short" type of electrical failure.

Bonding the coil to the stator walls is another difficult manufacturing step for this type of actuator. Thermally-conductive epoxy is often used to bond the coil to the inside of the stator walls, but very often, air bubbles are formed in the bond, leading to sub-optimal heat removal. The required epoxy curing time presents another challenge.

Absent some external angle-limiting element, it is known that these typical actuators can spin freely within the stator, and take on any rotational position. However, this is undesirable for optical scanning applications because these applications only exercise a mirror over a relatively limited range of angles—generally no greater than 40 degrees mechanical peak-to-peak. Moreover, when a single coil is used along with a two-pole magnet, a desirable torque is not produced at all rotational angles, and in fact no torque at all is produced at certain angles. For these reasons, an external rotational limit is imposed on this type of actuator. Most often, this limit is imposed by a "stopping pin", which is driven through one of the shafts, and which engages external stationary elements. Stopping pins of this sort are shown in FIG. 1 of U.S. Pat. No. 5,936,324 (item number 32); and FIG. 2 of U.S. Pat. No. 5,424,632 (item number 18).

When a stopping pin is used, the axial length of the shaft must necessarily be extended to make room for it. A hole is drilled in the shaft where the stopping pin resides. Although the stopping pin does largely fill the hole, it does not completely fill the hole. Therefore, the combination of a longer shaft plus the hole drilled for the stopping pin weakens the shaft, and undesirably lowers torsional and bending-mode resonant frequencies.

When using this type of conventional actuator for optical scanning applications, the costs involved in forming, inserting, and retaining the coil present a genuine limit to how inexpensive an optical scanner can be made, and this limit has prevented certain consumer-grade laser scanning applications from flourishing. For this reason, there is clearly a need for an electromechanical rotary actuator that generally provides all of the benefits of this type of conventional actuator for optical scanning applications, while also having lower manufacturing costs.

With reference again to FIGS. 7 and 8, one known actuator illustrated in U.S. Pat. No. 4,319,823 is designed for camera shutter applications. In this actuator, the coil is rectangular and surrounds the magnet, and a shaft is attached to the shaft using an intermediate, U-shaped member. Unfortunately, because of the way only a single shaft is used and the way in which the shaft is attached to the magnet, this actuator could not be used for high-performance optical scanning applications, especially if those applications also required rotor position information.

The above referenced patent publications including: U.S. Pat. No. 4,090,112 for Electrically Damped Oscillation Motor (apparently the first "moving magnet" type of optical scanner); U.S. Pat. No. 5,313,127 for Moving Magnet Motor (a moving magnet type actuator); U.S. Pat. No. 5,424,632 for Moving Magnet Optical Scanner with Novel Rotor design to Montagu (a moving magnet scanner and rotor assembly having a stopping pin); U.S. Pat. No. 5,936,324 to Montagu for Moving Magnet Scanner (motor employing stopping pin item); U.S. Pat. No. 6,633,101 to Stokes for Moving magnet Torque Motor (an actuator: U.S. Pat. No. 7,365,464 to Brown for Composite Rotor and Output Shaft for Galvanometer Motor and Method of Manufacture Thereof (a rotor assembly method similar to Montagu); and U.S. Pat. No. 8,569,920 to Ramon et al. for Small Electric Motor (commonly used rotor assembly and method) are presented by way of examples and are herein incorporated by reference in their entirety.

SUMMARY

In keeping with the teachings of the present invention, a limited rotation electromechanical rotary actuator may comprise a stator, a rotor assembly bidirectionally operable within the stator, and a single coil whose shape is generally rectangular. The electrical coil surrounds a rotor magnet on the top, bottom, and two sides.

The rotor assembly may include an output shaft, a solid cylindrical diametral-magnetized magnet and a position sensor shaft. The output shaft and position sensor shaft each include an aperture where the electrical coil can pass through while still allowing the rotor assembly to rotate.

BRIEF DESCRIPTION OF DRAWINGS

For a fuller understanding of the invention, reference is made to the following detailed description, taken in connection with the accompanying drawings illustrating various embodiments of the present invention, in which:

FIG. 9b illustrates another arrangement of cylindrical rotor magnet and coil windings, wherein the end-turns are formed to allow the magnet and rotor shaft to pass through;

DETAILED DESCRIPTION OF EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 10:
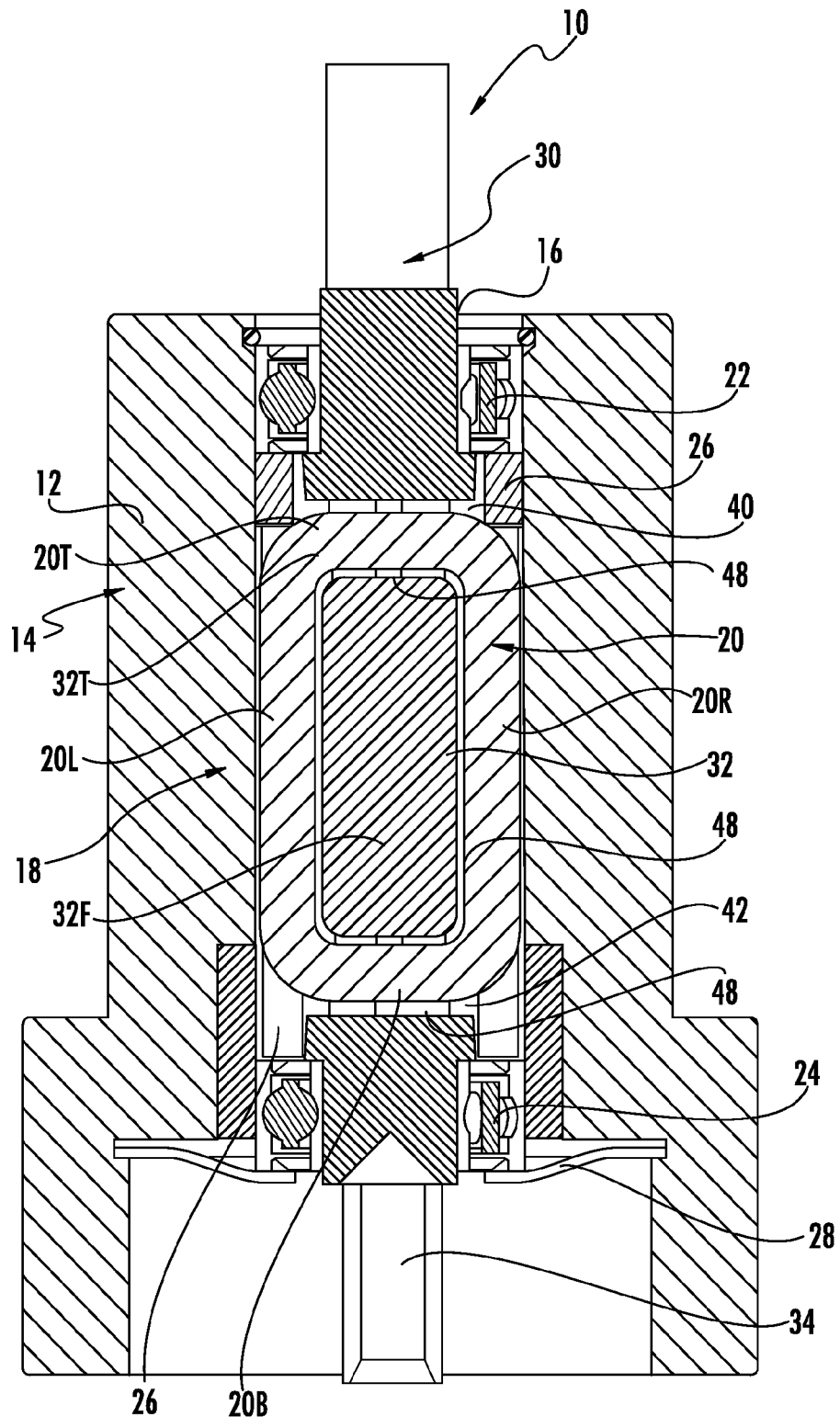
FIG. 10 illustrates a sectional view of an actuator according to the teachings of the present invention.
Figure 11:
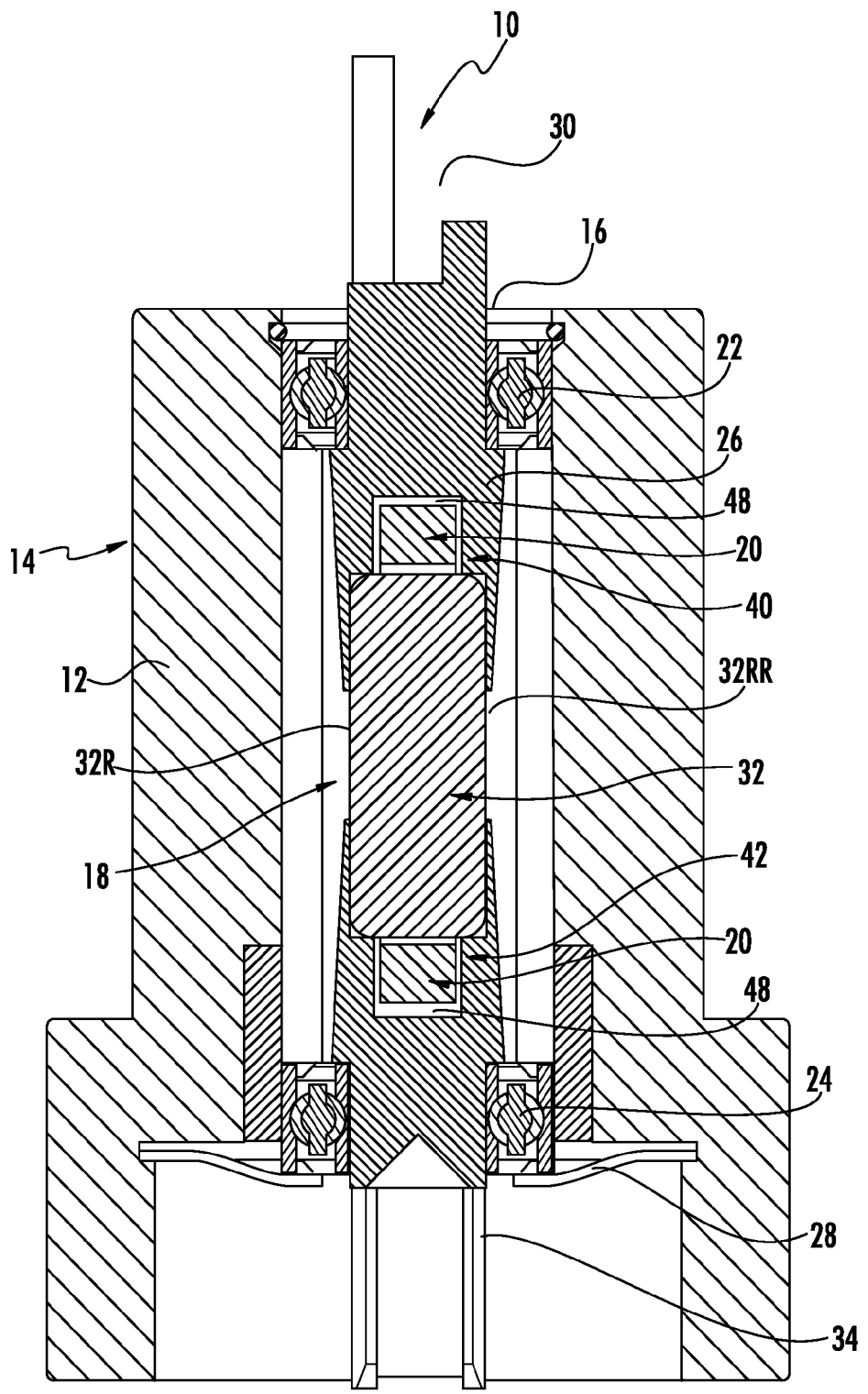
FIG. 11 illustrates another sectional view of the embodiment of FIG. 10, wherein in a plane of the sectional view is oriented 90-degrees compared to FIG. 10.
Figure 12:
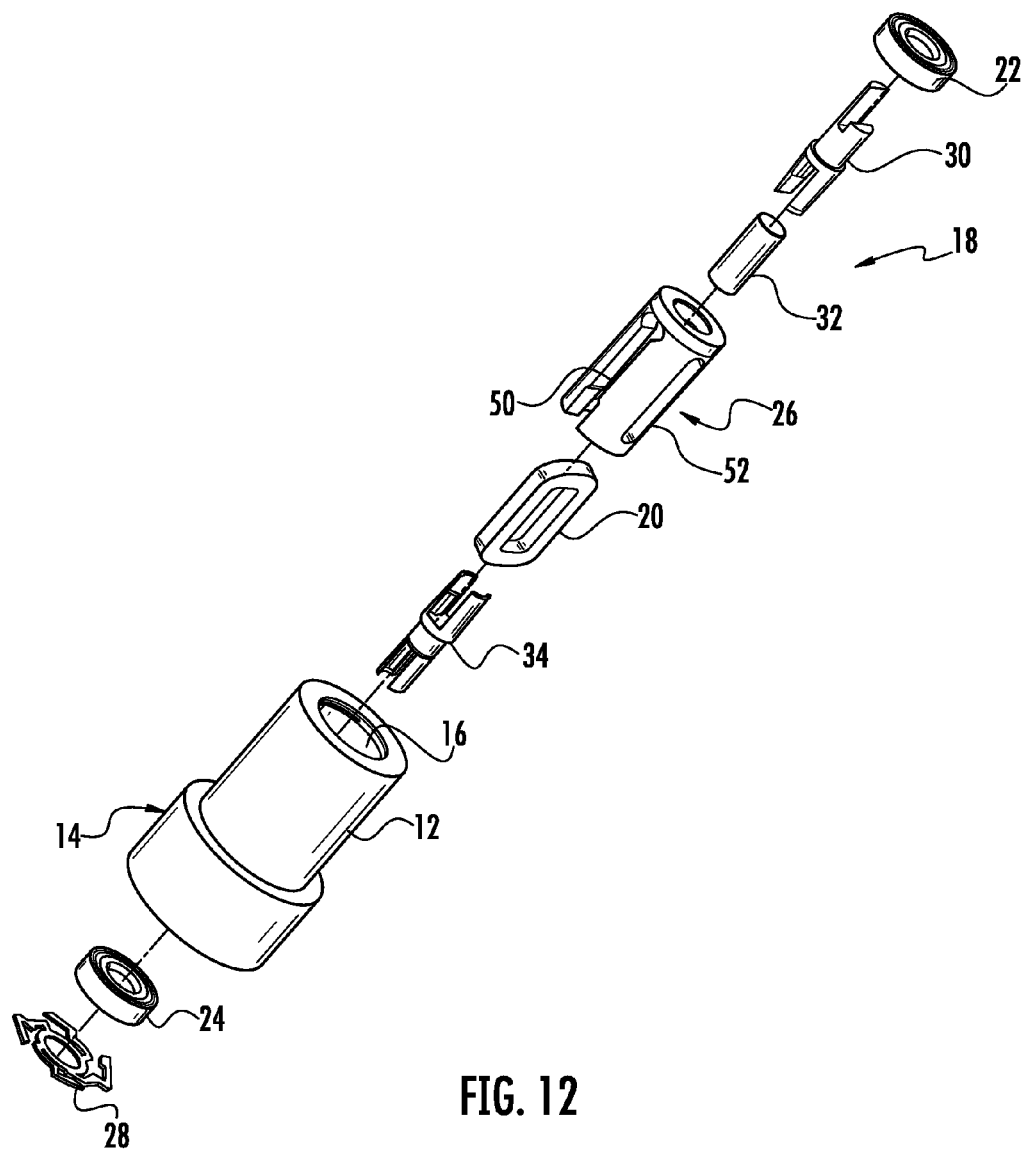
FIG. 12. is an exploded view of an actuator according to the teachings of the present invention.

Referring initially to FIGS. 10, 11, 12, one embodiment of the present invention is herein described as an electromechanical, limited rotation, rotary actuator 10. The actuator 10, herein described by way of example, includes an actuator body 12 which contains the stator 14, wherein the body may be integrally formed with the stator. The stator 14 has a bore or hole 16 extending axially therein which may be drilled into the stator, the hole being large enough to fit a rotor assembly 18 as well as a rectangular coil 20, top bearing 22, bottom bearing 24, and coil holder 26, by way of example. Note that in some embodiments, the top bearing 22 or bottom bearing 24 may have an outside diameter larger than an overall dimension of the hole 16 and thus, the hole may have portions which are larger to accommodate the bearings. As further illustrated with reference to FIG. 12, a bearing preload spring 28 may be employed.

Figure 13:
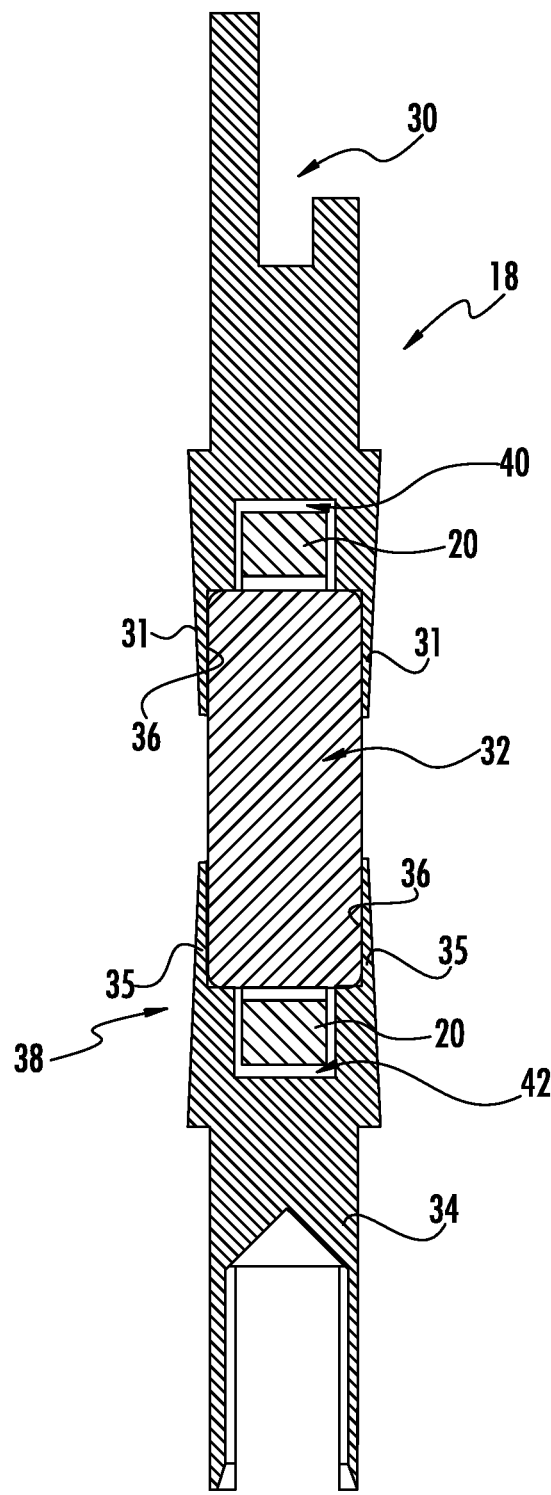
FIG. 13 is a diagrammatical illustration of a rotor assembly operable with the actuator of FIG. 11 according to the teachings of the present invention.
Figure 14:
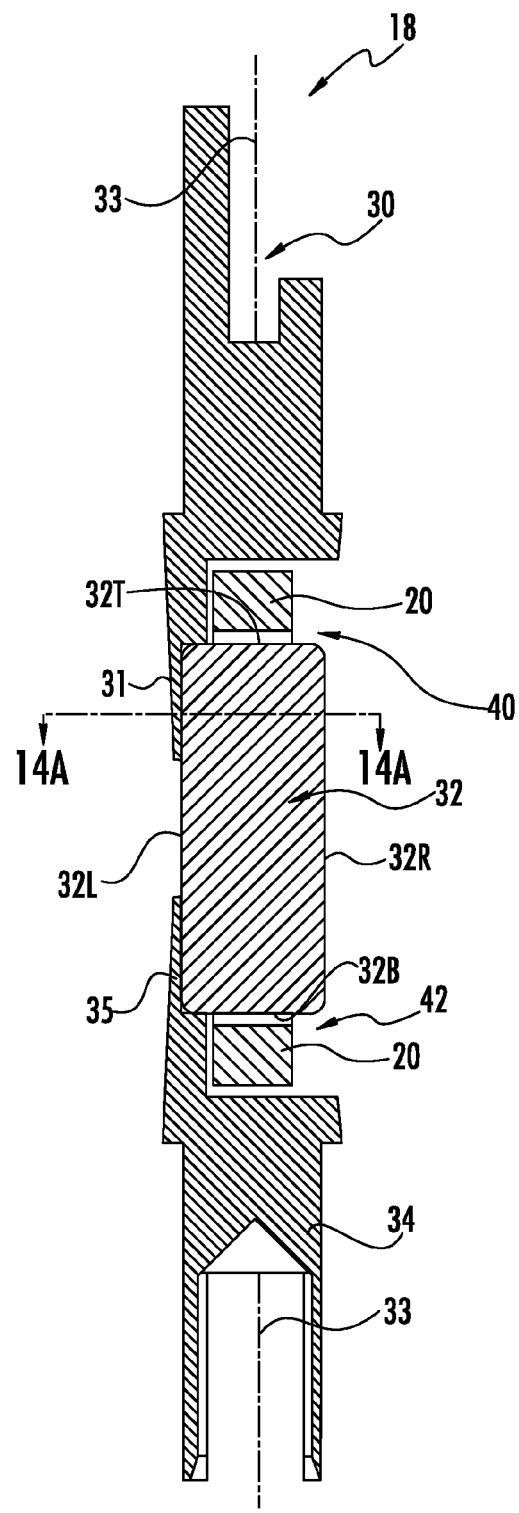
FIG. 14 illustrates one embodiment of a rotor assembly according to the teachings of the present invention.
Figure 14A:
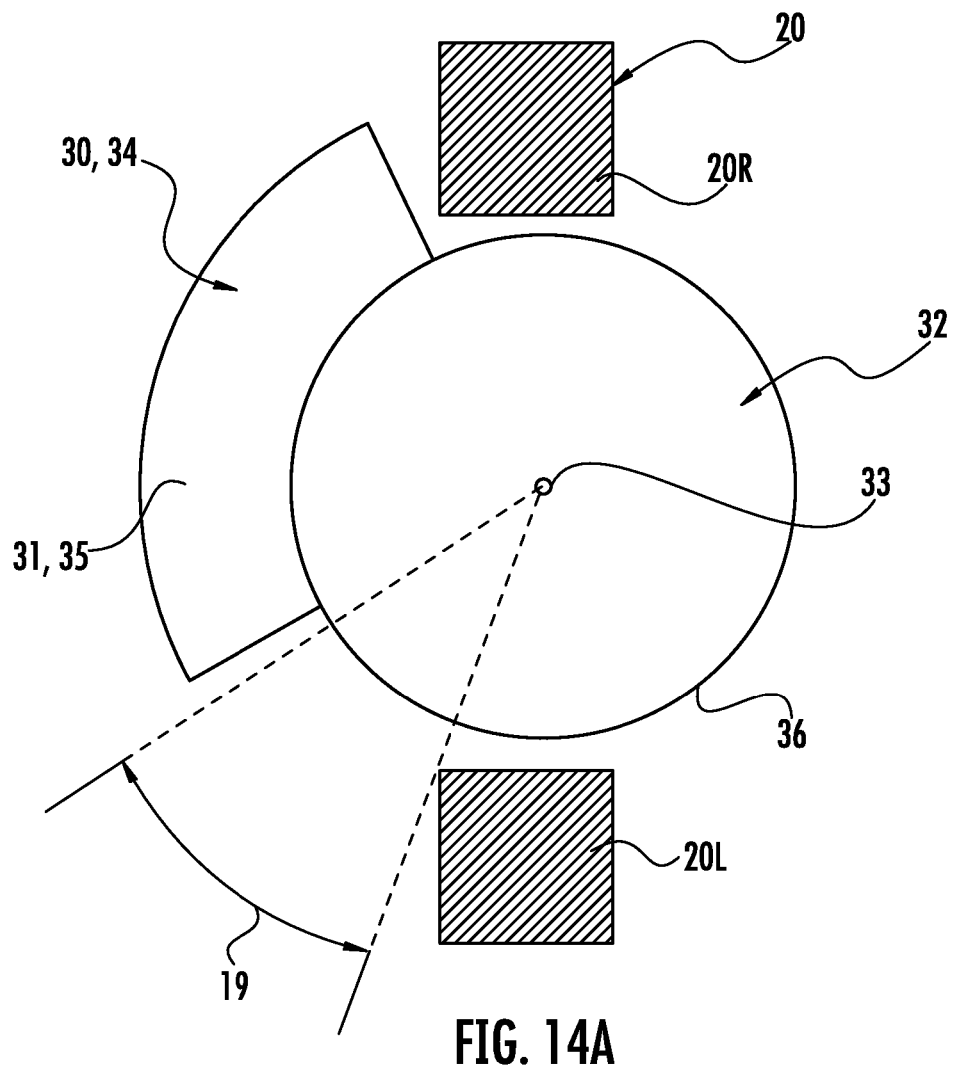
FIG. 14a is a partial cross-sectional view taken through lines 14a-14a of FIG. 14 illustrating a range of rotation limited within a region between coil sides, by way of example.

Referring now to FIGS. 13 and 14, the rotor assembly 18 for the embodiment herein described by way of example includes an output shaft 30, a magnet 32, and a position sensor shaft 34. The output shaft 30 is rigidly connected to a portion of the magnet 32, preferably with a majority of attachment on an outside periphery 36 (i.e. diameter) of the magnet. As herein described by way of example, the shaft 30 includes a connection 31 extending from a body portion of the shaft. With reference to FIG. 14a, the connection 31 is dimensioned to extend partially around a peripheral surface of the magnet 32. The position sensor shaft 34 is also rigidly connected to a portion of the magnet 32 on an axial opposite end 38, preferably with a majority of the attachment happening on the outside periphery 36 of the magnet 32. The shaft 34 as herein described by way of example includes a connection 35 extending from a body portion of the shaft 34. With reference again to FIG. 14a, it will be understood by those of skill in the art now having the benefit of the teachings of the present invention that the connection 35 is dimensioned to extend partially around a peripheral surface (periphery 36) of the magnet 32 and may be sized as is the connection 31 for maintaining the desired range of rotation 19. With continued reference to FIG. 14a, the rotor assembly 18 is bidirectionally operable over a limited range of rotation 19 with the stator 14, and extends into the hole 16. By way of example for the embodiment herein described, the limited range of rotation 19 will be determined generally by an arc length of the connectors 31, 35 such that the shafts 30, 34 can be rotated between opposing sides of the coil 20 without the connectors 31, 35 hitting the opposing sides of the coil. For the embodiment herein illustrated with reference to FIG. 14a, the connector 31 is rotated between opposing active coil portions. While the connectors 31, 35 illustrated with reference to FIG. 14a, by way of non-limiting example, are formed as a single continuous structure, it will come to the mind of those skilled in the art, now having the benefit of the teachings of the present invention, to form the single connectors 31, 35 as a plurality of connectors, wherein the outer connectors within the plurality of connectors define the arc length and thus the limited range of rotation 19. Further, and as illustrated with reference again to FIGS. 11 and 13, the connectors 31, 35 may comprise connector pairs. Yet further, while it is desirable to have the connectors 31, 35 substantially contacting the outer cylindrical surface of the magnet 32, as illustrated for the embodiments herein described, it will be understood by those of skill in the art that a portion of the top and bottom of the magnet may be contacted by the connectors 31, 35 without departing from the essence and teachings of the present invention. The coil is out of contact with the magnet, thus avoiding frictional contact therewith.

In the embodiment shown in FIG. 13, the magnet 32 is a two-pole, solid cylindrical diametral-magnetized magnet. Although there are several ways to form a rotor using a magnet, the use of a solid, cylindrical diametral-magnetized magnet provides desirable benefits. One benefit is that a sinusoidal flux-versus-angle (here the "angle" being with respect to the magnet itself) profile results from the magnet. This in turn produces an approximately sinusoidal output-torque versus rotor mechanical angle profile of the actuator 10 when current is applied to the coil 20. Nevertheless, other magnet shapes may be used and still remain within the spirit and teachings of the present invention, including a square and a rectangular shaped magnet, as long as the magnet has two poles arranged so that they coincide with the active portion of the rectangular coil 20. By way of further example, reference is again made to FIG. 10 illustrating the active coil portions 20R and 20L in close proximity to the North and South poles of the magnet 32.

Figure 15:
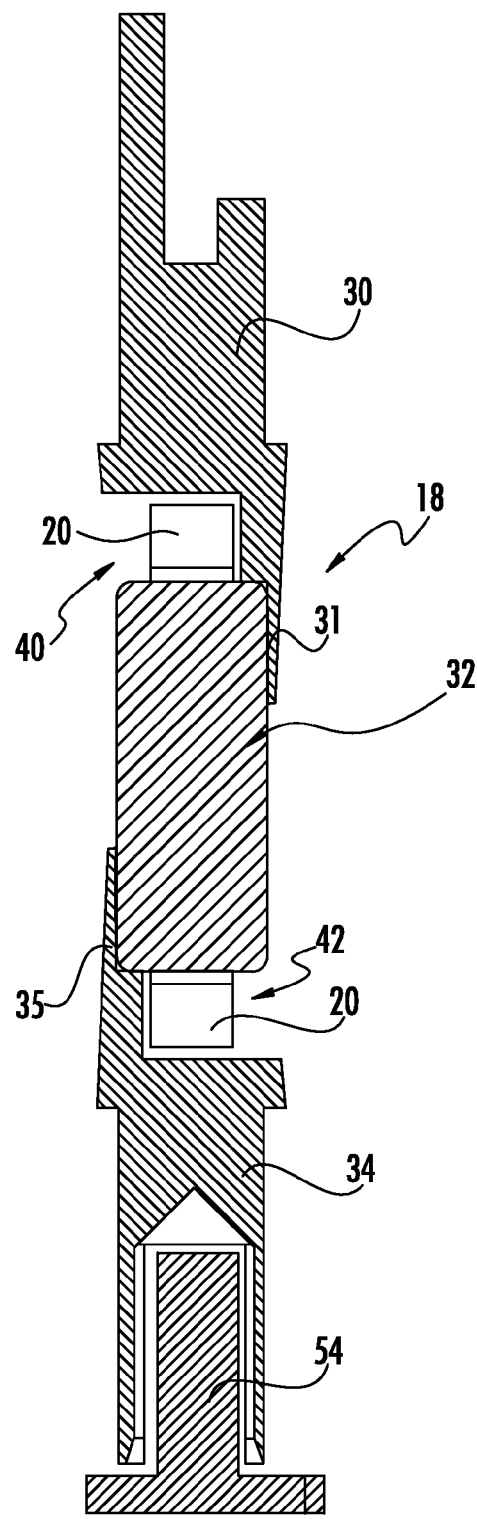
FIG. 15 illustrates another embodiment resulting from a method of forming the rotor assembly.
Figure 16A:
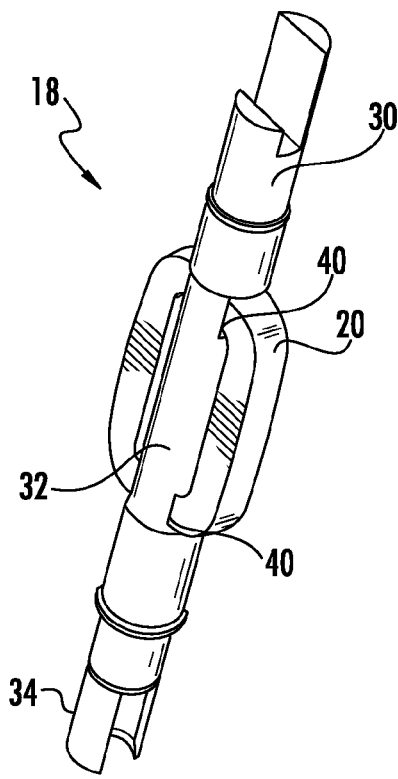
FIGS. 16a, 16b and 16c illustrate yet another embodiment, wherein a rotor assembly includes a magnet having notches or slots on each end and shafts having cup-type engagements.
Figure 16B:
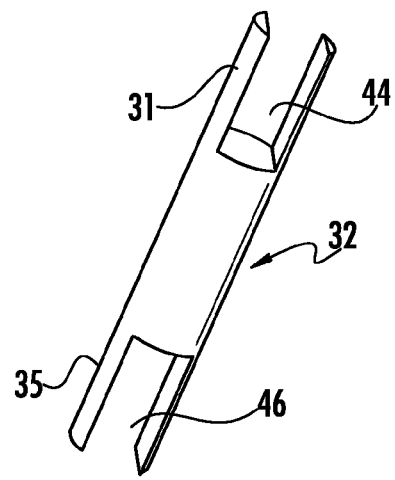
Figure 16C:
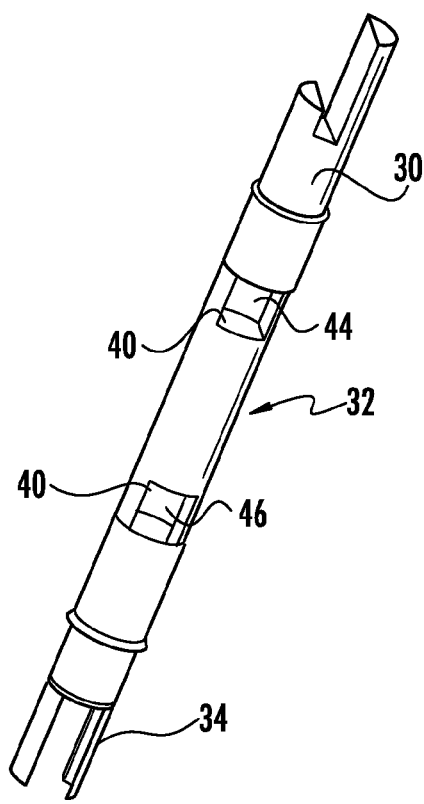

In known actuators used in the field of optical scanning, the shafts typically pass axially through to the rotor magnet, essentially forming an un-broken and continuous connection of the shaft through the magnet axis. However, with embodiments of the present invention as herein described by way of example, the rotor assembly 18 provides an aperture 40, 42 for the coil 20 to pass through, the aperture residing through each shaft 30, 34 as shown with continued reference to FIGS. 13 and 14, and now to FIG. 15, or alternatively through slots 44, 46 in the magnet 32 as shown in FIGS. 16a, 16b and 16c. The apertures 40, 42 provide a free space between the shaft 30, 34 and the coil 20 and between the coil 20 and the magnet 32. In the embodiments herein described by way of example, this aperture 40, 42 is facilitated through the fact that the output shaft 30 and the position sensor shaft 34 attach to only a portion of the magnet 32, and such attachment is made to outer surfaces 32L, 32R of the magnet 32 by way of example, thus shafts desirably not touching a center portion of top 32T and bottom 32B surfaces of the magnet proximate the longitudinal axis 33 of rotation.

With further emphasis, for the rectangular coil 20, herein described by way of example, with reference to the embodiments herein described, it is clear and desirable that material from the shafts 30, 34 does not touch the top and bottom surfaces 32T, 32B of the magnet 32 at or proximate the longitudinal axis, as illustrated with reference again to FIG. 14. End turns of the coil 20 are also out of contact with the magnet 32 at the top and bottom surfaces. In contrast, and typically in the art, structural elements make contact with the axis of the magnet. By way of example with reference to the above referenced U.S. Pat. No. 4,319,823, a U-shaped member touches the axis and the entire top surface of the magnet. For other well-known actuators, a shaft is typically aligned with the magnet and passes at least partially through the magnet along its axis. While sensors may not be attached, contact with the magnet will typically be used for aligning and pivoting the magnet.

FIGS. 16a, 16b and 16c illustrate an alternative embodiment for forming the rotor assembly 18 according to the teachings of the present invention. In this embodiment, the magnet 32 is a two-pole, cylindrical diametral-magnetized magnet, having the 44, 46 cut into top and bottom portions 32T, 32B. The output shaft 30 and the position sensor shaft 34 are each rigidly connected to the magnet 32 at outer portions of the slots 44, 46. In this embodiment of the rotor assembly 18, the shafts 30, 34 are relatively easier to make, having simple cup-like engagement areas. Note that in this embodiment, it is the magnet 32 which provides the apertures 40, 42 through which the coil 20 can pass.

With reference again to FIG. 10, it can be clearly seen that the electrical coil 20, herein embodied as a rectangular shaped coil by way of non-limiting example, surrounds the magnet 32 on top, bottom, left and right side thereof. Using the coil terminology established above, the left side 20L and right side 20R of the coil 20 are the "active portions" and the top side 20T and the bottom side 20B of the coil 20 are the "end-turns". The rectangular coil 20 herein described by way of example is excitable for providing bidirectional torque to the rotor assembly 18.

Since the two-pole magnet 32 is used, by way of example, along with the single electrical coil 20 whose active portions resides on only two sides 32L, 32R of the magnet 32, maximum rotor torque output occurs when the north and south poles of the magnet are in closest proximity to each active portion of the electrical coil, and minimum (essentially zero) torque occurs when the north and south poles of the magnet are at a 90-degree angle to the active portion of the coil, as illustrated with continued reference to FIG. 10.

The inside dimensions of the coil 32 are chosen to provide a gap 48 around the magnet 32, which is herein referred to as free space between the magnet and the coil. This gap 48 is preferably made as small as possible because as this gap increases, coil area (where turns of wire can be placed to create torque) effectively decreases. For the actuator 10 shown in FIG. 10 and FIG. 11, this gap 48 is around 0.006 inches all the way around the magnet 32, but this should not be construed as a limitation.

The outside dimensions of the coil 20 are chosen to be small enough to fit into the hole 16 in the stator, and also small enough to work with the aperture 40, 42 for the coil to pass through, ultimately providing the free space between the shaft 40, 42 and the coil.

As illustrated with continued reference to FIG. 10 and FIG. 11, for both the output shaft 30 and the position sensor shaft 34, there is the gap 48 providing the free space between the shaft 30, 34 and the coil 20, and also a free space between the coil and the magnet 32. These free spaces are effectively provided by the aperture 40, 42 for the coil 20 to pass through, and allows for the rotor assembly 18 to rotate freely over a limited range of rotation.

By way of example, this aperture 40, 42 for the coil 20 to pass through works together along with the thickness of the electrical coil to define the range of operating angles for the actuator 10, because the aperture for the coil to pass through must be large enough to allow the coil to pass through while also allowing the rotor assembly 18 to rotate. As the aperture 40, 42 for the coil 20 to pass through is made larger, the rotor assembly 18 is able to rotate through a greater range of angles. However, increasing the size of the aperture 40, 42 for the coil 20 to pass through also consequently decreases an amount of shaft material that remains in rigid connection with the magnet 32, thereby making the overall rotor assembly 18 weaker. Therefore, the coil 20 dimensions and size of the aperture 40, 42 for the coil to pass through must be traded off as desired to accomplish the desired limited rotation angle of the actuator 10 and desired strength and stiffness of the overall rotor assembly 18.

With continued reference to FIG. 10 and FIG. 11, it is clearly shown that the output shaft 30 and the position sensor shaft 34 attach to the magnet 32 at primarily two places. As will be understood by those of skill in the art, the shape of the attaching area depends on the shape of the magnet 32 (i.e. if it is cylindrical or more cubical). If the magnet 32 is cylindrical, then the output shaft 30 and the position sensor shaft 34 preferably attach to the magnet 32 at mating arc-shaped areas, primarily around the outer diameter of the magnet. If the magnet 32 is cubical, then the output shaft 30 and the position sensor shaft 34 preferably attach to the magnet 32 on two flat sides of the magnet.

Typically, the output shaft 30 and the position sensor shaft 34 would be attached to the magnet 32 using an adhesive such as an epoxy. Adhesives used in embodiments herein described have included anaerobic adhesives and cyanoacrylate, by way of non-limiting example. By way of further example with reference again to FIG. 11, the output shaft 30 and the position sensor shaft 34 both attach primarily to the magnet 32 on the left side 32L and right side 32R of the magnet. In FIG. 11, it can be seen that the output shaft 30 and the position sensor shaft 34 do not attach to the magnet 32 at the rear 32RR or front side 32F of the magnet. The rear and front sides 32RR, 32F are where the aperture 40, 42 for the coil 20 to pass through resides. Although the output shaft 30 and the position sensor shaft 34 are not attached to the magnet 32 on all surfaces, this rotor assembly 18 and assembly forming method are sufficiently strong for many applications, including optical scanning. In fact, computer simulation followed by testing showed that rotor stiffness of this configuration is as desirable as conventional moving magnet galvanometer scanners.

In order for the rectangular coil 20 to surround the magnet 32 as shown in FIG. 10 and FIG. 11, this places a constraint on the order in which the actuator 10 is assembled. To assemble the rotor assembly 18 of the actuator 10 shown in FIG. 10 and FIG. 11, the rectangular coil 20 is first placed loosely around the magnet 32t, and then the output shaft 30 and the position sensor shaft 34 are attached to the magnet (for example using epoxy). The rotor assembly 18 and the coil 20 combination are then inserted into the hole 16 of the stator 14 and the coil 20 is held in place using the coil holder 26 or coil holding means.

However, this may make assembly of the rotor assembly 18 somewhat complicated. An assembler must manage axially fixing the output shaft 30 and the position sensor shaft 34 onto the magnet 32 while the coil 20 is loosely in place. Care must be taken to make sure no adhesive (if used) gets on the rectangular coil 20, thus avoiding impeding free rotation.

As an alternative, the output shaft 30 and the position sensor shaft 34 may be embodied in such a way that they only attach to a single side of the magnet 32 rather than two sides. This is shown in alternate embodiments illustrated with reference to FIG. 14 and FIG. 15. In these cases, the aperture 40, 42 for the coil 20 to pass through includes not only a free space between the magnet 32 and the coil and a free space between the shaft 30, 34 and the coil, but also a completely open side, through which the coil may be inserted after the output shaft 30 and the position sensor shaft 34 are already attached to the magnet 32. By way of non-limiting example, FIG. 14 illustrates one possible embodiment in which the output shaft 30 and the position sensor shaft 34 are attached to the magnet 32 on the same side (here on the left side 32L as illustrated in the drawing view). Because of this, the rotor assembly 18 can be completely formed without the coil 20, and then later the rectangular coil 20 can be placed into the assembly 18 from the right, by way of example. Yet further, FIG. 15 illustrates another possible embodiment in which the output shaft 30 and the position sensor shaft 34 are attached to the magnet 32 on opposite sides. In this case, once the rotor assembly 18 is completely formed, the coil 20 can be brought in from the top or the bottom and then rotated into position. Of course, the rotor assemblies 18 shown in FIG. 14 and FIG. 15 may not be as strong as the rotor assemblies shown in FIG. 13 and FIGS. 16a, 16b and 16c because there is less shaft material in contact with the magnet 32, assuming a similar adhesive is used. Therefore, there is a trade-off between rotor stiffness/strength and ease/order of assembly.

In any event, since the magnet 32 is supported at the top and bottom by separate shafts 30, 34, the rotor assembly 18 embodiments described herein achieves a level of stiffness that has proven to be acceptable for optical scanning applications, with the rotor assemblies shown in FIG. 13 and FIGS. 16a-16c being as desirable as those of conventional moving magnet galvanometer scanners, while also having similar inertia. This is counter-intuitive, since placing an aperture 40, 42 in between the magnet 32 and each shaft 30, 34 would intuitively tend to reduce stiffness. Stiffness is maintained by ensuring a liberal amount of contact area between the magnet 32 and the output shaft 30, as well as the magnet and the position sensor shaft 34, and by fixing the magnet to each shaft around the outer periphery of the magnet. Stiffness is also maintained due to the fact that each shaft 30, 34 is directly affixed to the magnet 32, instead of using some intervening element between each shaft and the magnet. As described above with reference to connectors 31, 35 of the shafts 30 and 34, similar connectors 31, 35 may be formed using the material of the magnet, as illustrated with reference again to FIG. 16b.

By way of further example, to maximize fatigue resistance while also not interfering with the magnetic flux produced by the magnet 32 and electrical circuit of the coil 20, the output shaft 30 and the position sensor shaft 34 may be made from a non-magnetic Stainless Steel such as grade 303, but this is not intended to be a limitation. Other materials, including even plastic materials such as Delrin, Nylon or PEEK can be used when rotor stiffness is not a paramount concern.

In this example embodiment, the actuator body 12 is formed as the stator 14, and is a simple, tubular shape. To maximize torque output from the actuator 10, the stator 14 is made of a magnetic conductive material. One possible inexpensive material that will work effectively is cold rolled steel such as 1018 steel, but magnetic stainless steels will also work effectively, such as 416 or 430. When it is desirable to minimize positional hysteresis (but at a much greater stator material expense), Carpenter 49 nickel-steel can be used.

Alternatively, the stator 14 may not include any magnetic conductive material at all, and may by way of example, be made out of plastic such as Delrin, Nylon or PEEK. When the stator 14 does not include magnetic conductive material the actuator 10 will produce considerably less torque—perhaps less than half of that when using magnetic permeable material. However, electrical inductance of the rectangular coil 20 will also be correspondingly reduced, and therefore for certain applications, making the stator 14 from a non-magnetic-conductive material may be desirable.

Figure 17A:
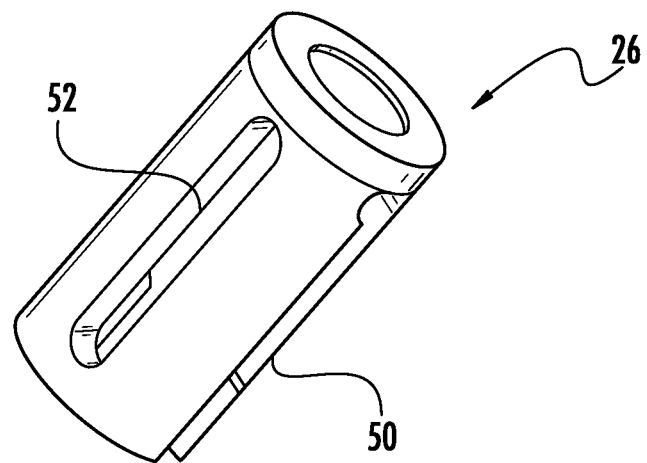
FIG. 17a and FIG. 17b illustrate views of a coil holder herein implemented as a slotted, cylindrical coil holder.
Figure 17B:
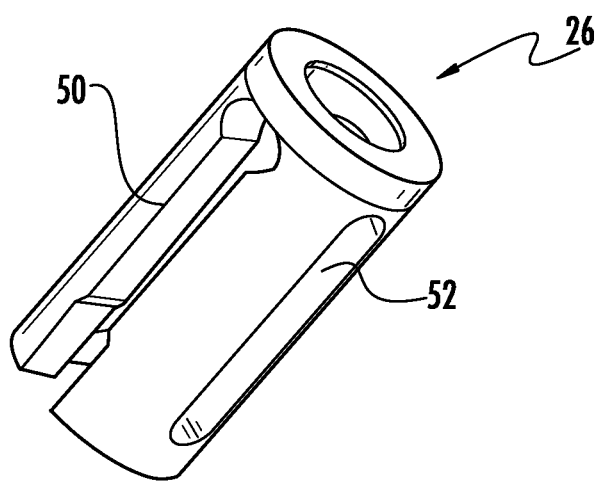

Further, the rectangular coil 20 may be held in place within the stator 14 using a variety of means. However, in the embodiment illustrated by way of example in FIG. 10 and FIG. 12, coil holding means, the coil holder 26, is implemented as a slotted, cylindrical coil holder. This may be a tubular element whose inside diameter is large enough for the rotor assembly 18 to pass through, and whose outside diameter is small enough to fit within the hole/bore 16 of the stator 14. This tubular element has at least a coil slot 50 on diametrically-opposed sides, sufficient for the rectangular coil 20 to slide into and be held in place, as illustrated with reference to FIGS. 17a and 17b.

The rectangular coil 20 may also be held in place within the stator 14 using a coil holding means implemented as a slotted, cylindrical coil holder that is effectively cut in half (i.e. two half cylindrical coil holders). Other means of holding the coil into place may also be devised while still remaining within the scope of this invention.

In some embodiments, the coil holder 26 may be made from a material that is not magnetically conductive, such as a plastic material (for example Delrin, Nylon or PEEK), however many materials can be used including thermally-conductive plastics as well as non-magnetically-conductive metals such as Aluminum. Note that when the coil holder is made from an electrically-conductive material such as aluminum, eddy currents may be formed in the coil holding means during coil excitation. These eddy currents have the effect of reducing apparent inductance. However, some damping of the rotor assembly rotation will also be present since this coil holding means will essentially function as a "shorted turn" of the electrical coil.

Figure 5:
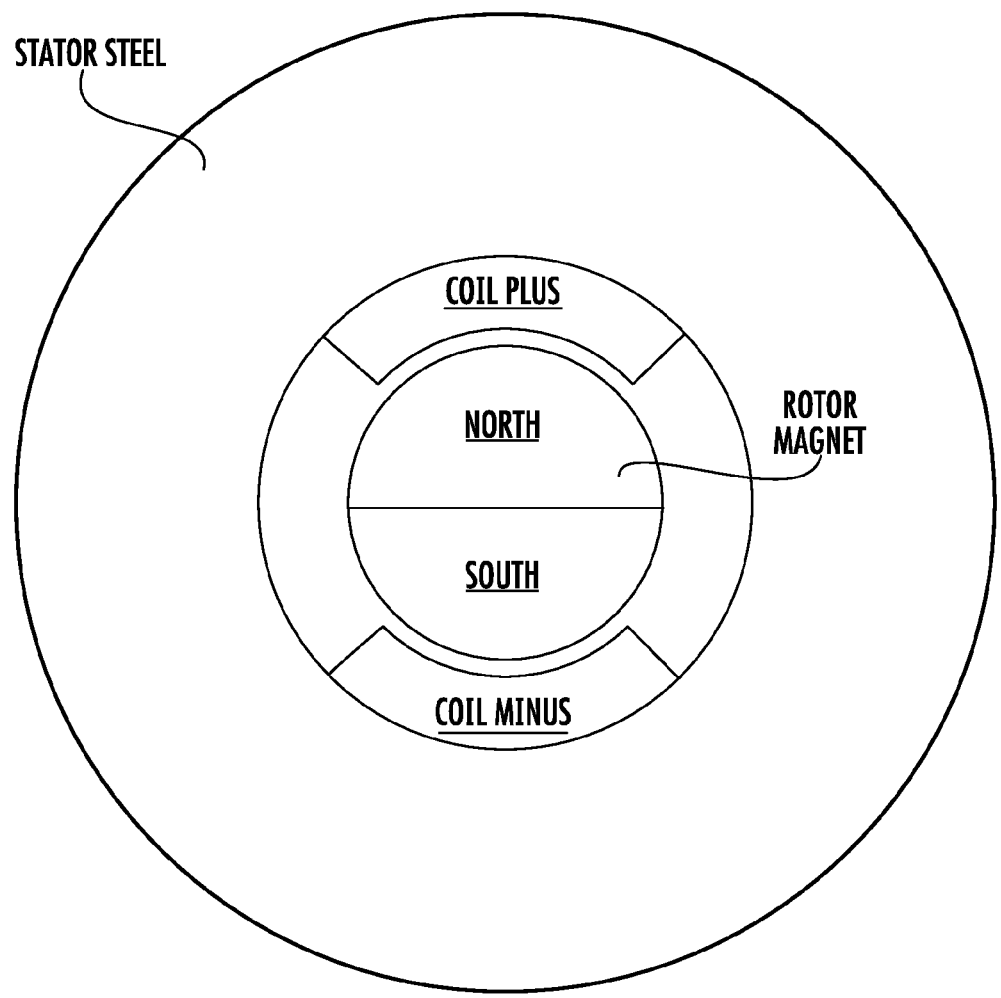
FIG. 5 illustrates a sectional view of an arrangement of rotor magnet, stator steel and coil placement in a known actuator.
Figure 6:
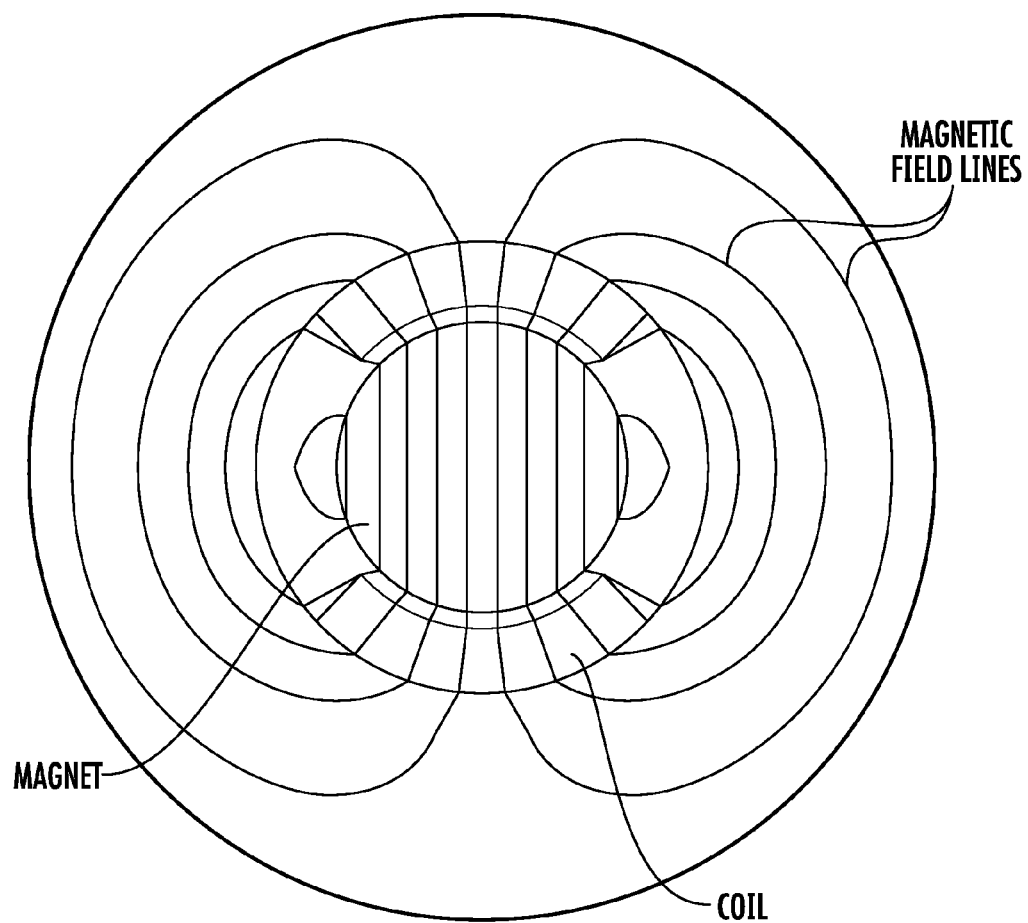
FIG. 6 illustrates a magnetic field lines in the arrangement shown in FIG. 5, if a solid cylindrical diametral-magnetized magnet is used.
Figure 7:
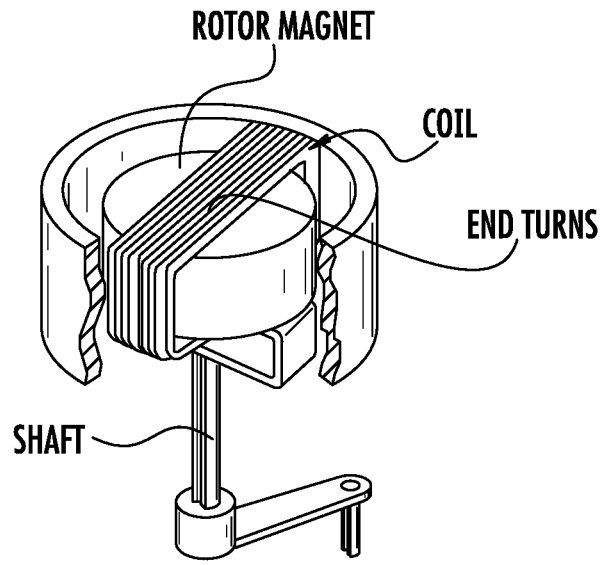
FIGS. 7 and 8 illustrate a known actuator as described in U.S. Pat. No. 4,319,823, having magnet and coil winding with end turns.
Figure 8:
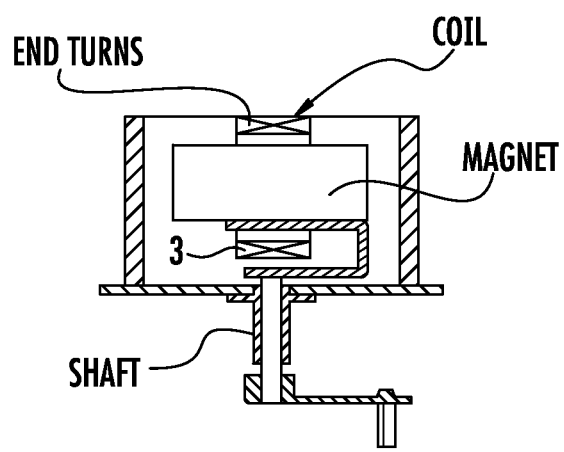
Figure 9A:
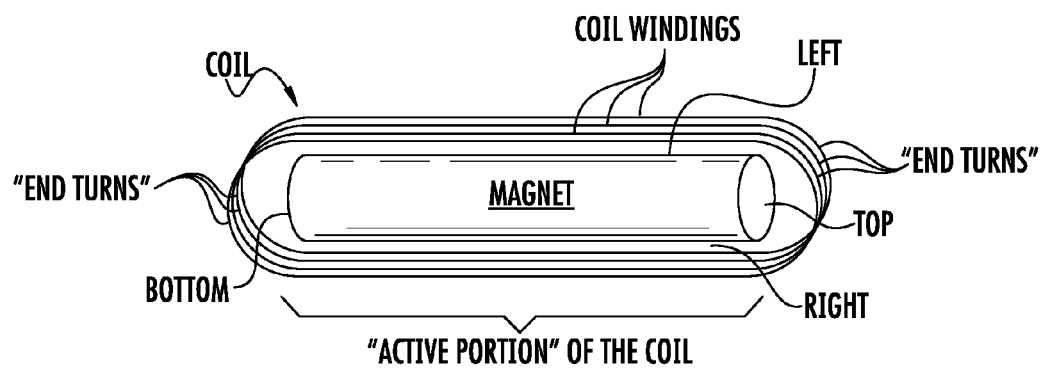
FIG. 9a is a diagrammatical illustration of a coil wound around a cylindrical magnet is one desirable manner to avoid having to form end turns for receiving a shaft.
Figure 9B:
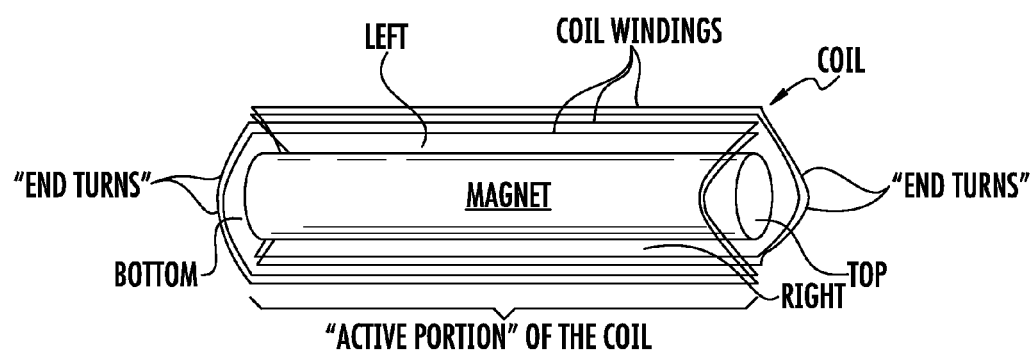
Figure 18:
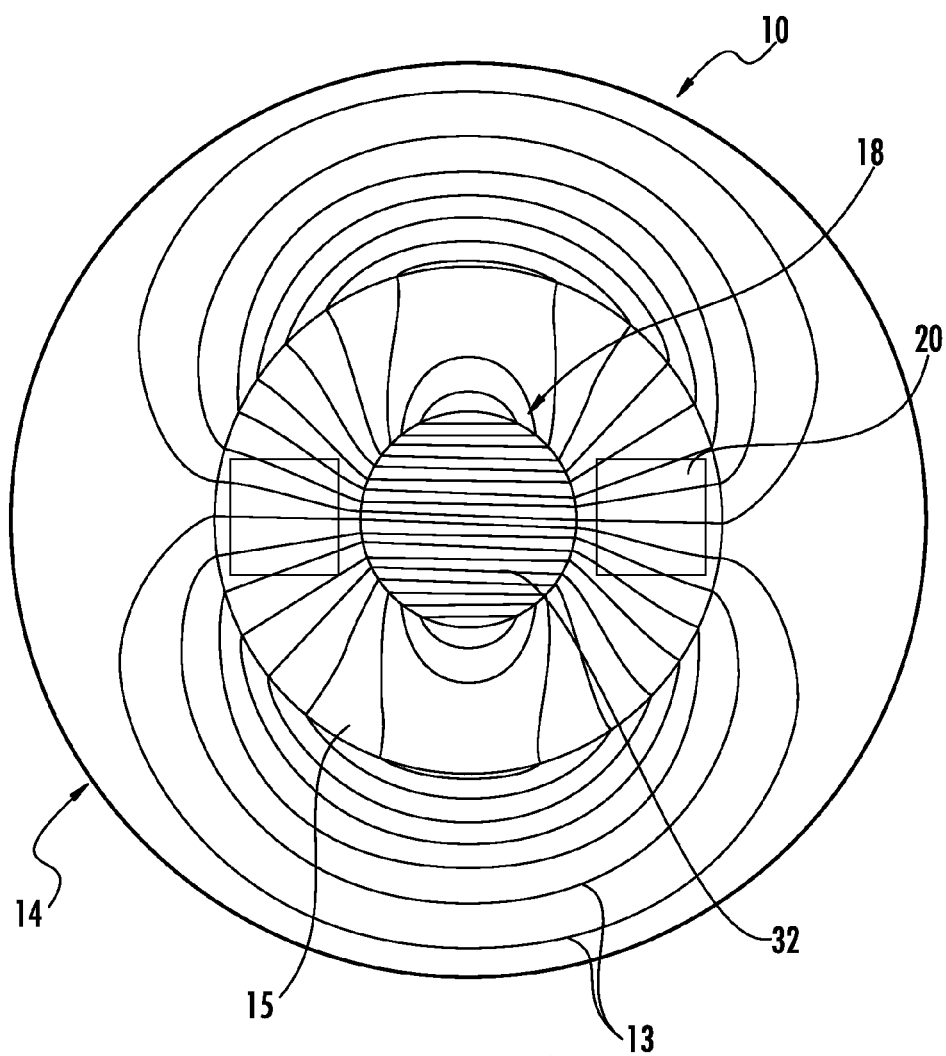
FIG. 18 illustrates magnetic field lines in an embodiment of the present invention when the rotor magnet is a solid, cylindrical diametral-magnetized magnet and when the coil holder is made of a material not made from magnetically conductive material for effectively forming a slotless actuator.

When the coil holder 26 is made from a material that is not magnetically conductive, the actuator 10 is essentially a slotless type of actuator, where the electrical coil turns reside in the air-gap between the magnet and the inside diameter of the stator, thus having similar performance to conventional optical scanners such as that shown in FIG. 5 and FIG. 6 if a similar magnet is used. Here, the magnetic air-gap 15 is relatively large. The magnetic field lines 13 that correspond to this configuration can be seen in FIG. 18, assuming the magnet 32 is a solid cylindrical diametral-magnetized magnet.

In other embodiments, the coil holder 26 may be made from a material that is magnetically conductive, such as the same material used for the stator body 12 (including 1018 steel, 416 or 430 stainless steel, or carpenter 49). When the coil holder 26 is made from a magnetically conductive material, the actuator 10 is essentially a slotted type of actuator, and the electrical coil turns do not reside in the air-gap 15 between the magnet 32 and the inside diameter of stator 14. In this case, torque production is dramatically improved since the length of the magnetic air-gap 15 is decreased. The magnetic field lines 13 that correspond to this configuration can be seen in FIG. 19, assuming the magnet 32 is a solid cylindrical diametral-magnetized magnet.

Figure 19:
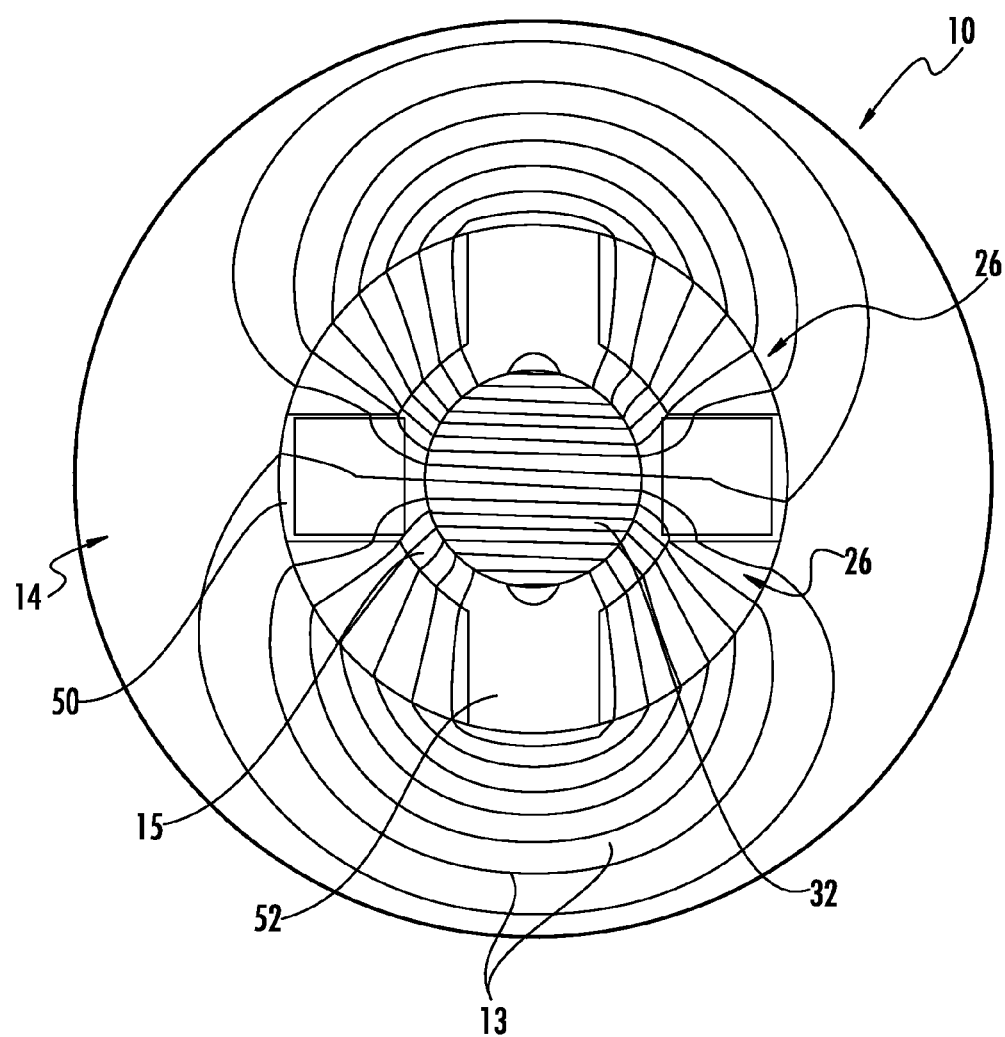
FIG. 19 illustrates the magnetic field lines in the present invention when the rotor magnet is a solid, cylindrical diametral-magnetized magnet and the coil holder is made of a material that is made from magnetically conductive material for effectively forming a slotted actuator.

If the inside dimensions of the coil holder 26 is implemented in such a way that it has a simple circular cross section (with the exception of slots 50 needed for the coil to fit through), then the actuator 10 will have a strong tendency to cog toward the outside of the range of rotation angles. Therefore, "shaping" the interior cross section of the coil holder may be desirable if it is made from a magnetically conductive material. One example of this shaping can be seen with reference again to FIG. 17a and FIG. 17b. Here additional slots 52 are cut into the coil holder 26. When a solid cylindrical diametral-magnetized magnet is used and when the additional slots 52 on the coil holder 26 are approximately as wide as those slots 50 used to hold the coil, cogging is virtually eliminated. These slots 50, 52 are also illustrated in FIG. 19.

Although in this example embodiment, the stator 14 is integrally formed with the actuator body 12 and made from a single material, it is also possible to form the stator with laminations, manufactured using any known manufacturing technique, such as punching, laser cutting, or photo etching the shape into thin laminations. Moreover, the coil holder 26 may also be integrally formed with a stator manufactured in this way, having a slot sufficiently large for the coil 20 to pass through.

As above described, the bore, or herein described hole 16, in the stator 14 must be sufficiently large to allow the rotor assembly 18 to fit through along with the rectangular coil 20. However, the dimensions of this hole 16 also effectively define a maximum outside dimension of the electrical coil 20. As the hole 16 in the stator 14 is made larger, there is greater room to fit more electrically conductive material (i.e. turns of copper wire) on the electrical coil 20. However, as the hole 16 is made larger and the electrical coil 20 is also made larger, those turns of wire farthest from the magnet 32 (and closest to the walls of the hole in the stator 14) are less productive than the turns of wire that are closest to the magnet 32. Moreover, if the stator 14 is made of a magnetic conductive material, increasing the dimensions of the hole 16 in the stator 14 also increases the air gap that the flux from the magnet must jump (unless coil holders made of magnetically-conductive material are used). This effectively reduces flux density in both the magnet and also in the air gap where the electrical coil resides.

In FIG. 10 through FIG. 14, the position sensor shaft 30 is used along with the output shaft 34 for optical scanning applications to desirably have positional information. In such a case, a position sensor assembly 54 (herein generically illustrated with reference again to FIG. 15) would be used in close proximity to the position sensor shaft. Reference is made to U.S. Pat. No. 8,508,726 (the disclosure of which is herein incorporated by reference in its entirety) for examples of the position sensor assembly 54 useful with embodiments of the invention herein described. However, when position information is not needed or is gathered externally, the position sensor shaft 34 is still of benefit, since it helps to support the magnet 32 and thus, provides additional lateral stiffness.

Figure 1:
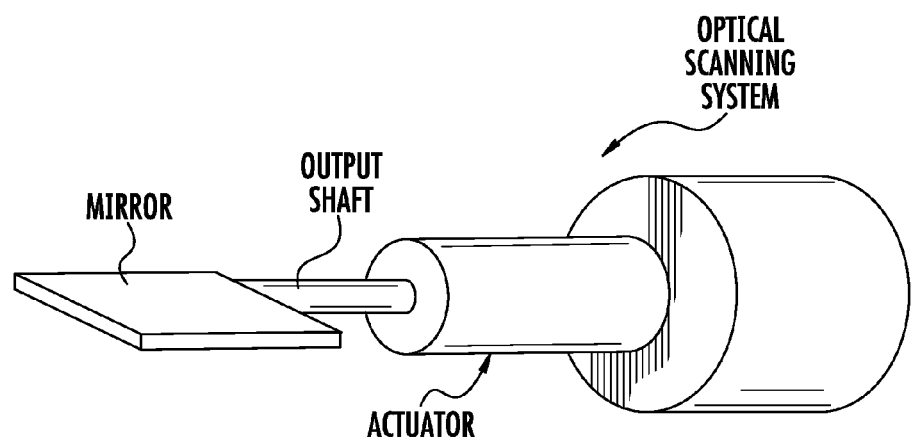
FIG. 1 illustrates a typical optical scanner, wherein a mirror is placed onto an end of an actuator shaft.
Figure 2:
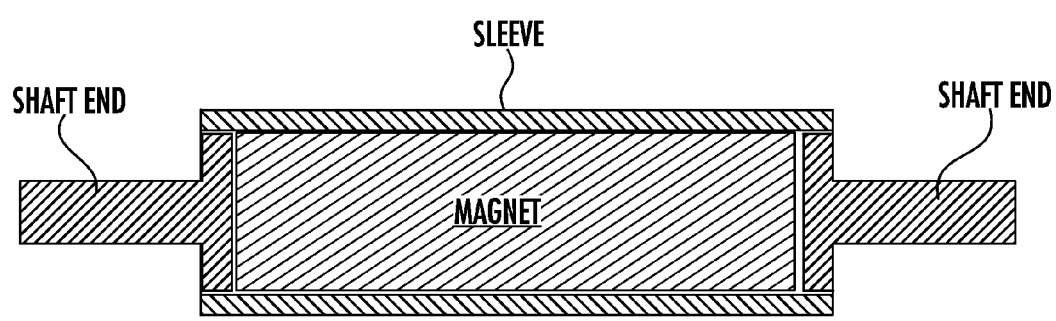
FIG. 2 illustrates one type of known rotor assembly, as described in U.S. Pat. No. 5,424,632, wherein two shaft-ends are attached to a sleeve, with a rotor magnet contained within the sleeve.
Figure 3:
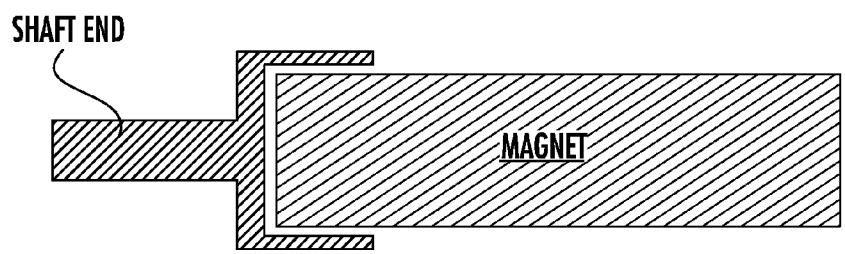
FIG. 3 illustrates another type of known rotor assembly, as described in U.S. Pat. No. 6,633,101, wherein a single shaft end is attached to the magnet, and wherein the shaft end is completely cylindrical, essentially forming a "cup" into which the magnet is fully inserted.
Figure 4:
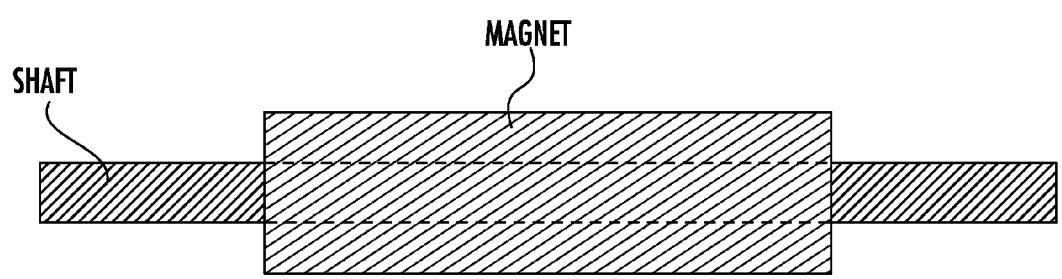
FIG. 4 illustrates yet another type of known rotor assembly, wherein the magnet is tubular, having a hole through it through which a solid shaft passes.

The output shaft 30 may carry an optical element, such as the mirror as illustrated with reference again to FIG. 1. The optical elements may comprise a mirror, prism or filter effectively used in optical scanners.

One benefit of the actuator 10 of the present invention is that it is desirably much less costly to manufacture and has the potential to be more electrically efficient than typically known actuators. Since the coil 20 is made in a simple rectangular shape, the coil may be wound on common coil winding machines which allow for a very high degree of copper packing, while simultaneously producing the coil at very low cost. The coil 20 is then held in place using the slotted, cylindrical coil holder 26 which, in some embodiments, may be press-fit into place or may even be integrally formed with the stator 14 rather than using adhesive.

In one example actuator 10 currently being manufactured, performance is desirably good, being generally competitive with the performance of conventional moving-magnet galvanometers on the current market. In this example actuator 10, the actuator body 12 and the stator 14 are formed using a single piece of 1018 cold rolled steel. The outside diameter of the actuator body 12 is 0.5 inches. The hole 16 in the stator is a 6 mm hole. The magnet 32 is made of Neodymium Iron Boron, having a diameter is 0.120 inches and length is 0.315 inches. The output shaft 30 and the position sensor shaft 34 are each 3 mm in diameter and supported by the top bearing 22 and the bottom bearing 24 which also have 6 mm outside diameter so they fit perfectly within the aperture in the stator. The bearing preload spring 28 applies approximately 6 ounces of force on the bottom bearing 24, keeping balls inside the bearings 22, 24 seated and preloaded. The rectangular coil 20 has an inside dimension (closest to the magnet) of 0.132 inches and outside dimension (closest to the aperture in the stator) of 0.224 inches, and having a thickness of 0.070 inches. The coil 20 has 100 turns of AWG #36 wire, which provides a coil resistance of approximately 4 ohms. For this actuator 10, when the coil holder 26 is made of a non-magnetically-conductive material, the torque constant is 18,000 Dyne*CM per amp of current flowing through the coil. For the actuator 10, when the coil holder 26 is made of a magnetically-conductive material and having inside diameter of 0.160 inches, the torque constant is 23,000 Dyne*CM per amp of current flowing through the coil. The aperture 40, 42 for the coil 20 to pass through in the output shaft 30 and the position sensor shaft 34 are sized such that the rotor assembly 18 rotates through a 30 degree peak-to-peak mechanical angle.

Although a detailed description and drawings of the invention has been provided above, it is to be understood that the scope of the invention is not to be limited thereby. Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

The invention claimed is:

1. An electromechanical, limited rotation rotary actuator comprising:
    a stator having a bore extending therein;
    a two-pole, cylindrical diametral-magnetized magnet extending into the bore and rotatable about a longitudinal axis, wherein the magnet is defined as having opposing first and second axial ends and a peripheral radial surface extending therearound;
    a first shaft rigidly affixed to the magnet by a first connector proximate the first axial end of the magnet and rotatable about the longitudinal axis, wherein a first aperture is formed between an axial end of the first shaft and the first axial end of the magnet;
    a second shaft rigidly affixed to the magnet by a second connector proximate the second axial end and rotatable about the longitudinal axis, wherein a second aperture is formed between an axial end of the second shaft and the second axial end of the magnet;
    a rectangular toroidal electrical coil fixed within the bore, wherein the coil surrounds the magnet within a plane passing through the longitudinal axis, the plane passing through the opposing first and second ends of the magnet and the peripheral radial surface, wherein the peripheral side of the magnet interacts with opposing active coil portions, and wherein the opposing first and second end-turns of the coil are carried within the first and second apertures, respectively, and wherein exciting the coil provides limited rotation of the first and second connections between the opposing active coil portions, thus providing limited rotation of the magnet and bidirectional torque to the shafts; and
    a coil holder operable with the stator for securing the electrical coil to the stator, the coil holder comprising a tube having first slots on diametrically opposed sides thereof sufficient for fixing the coil therein.

2. The actuator according to claim 1, wherein the coil holder further comprises second slots, wherein the second slots are approximately as wide as the first slots holding the coil, thus reducing cogging.

* * * * *